United States Patent
Fiaschi et al.

(10) Patent No.: US 11,582,647 B2
(45) Date of Patent: Feb. 14, 2023

(54) METHODS AND APPARATUS FOR MANAGING RESOURCE USAGE ACROSS DOMAINS IN A COMMUNICATION NETWORK

(71) Applicant: Telefonaktiebolaget LM Ericsson (publ), Stockholm (SE)

(72) Inventors: Giovanni Fiaschi, Sollentuna (SE); Bo Åström, Stockholm (SE); Michael Åström, Rönninge (SE); Stefan Dahlfort, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 176 days.

(21) Appl. No.: 16/478,183

(22) PCT Filed: Jan. 30, 2017

(86) PCT No.: PCT/EP2017/051946
§ 371 (c)(1),
(2) Date: Jul. 16, 2019

(87) PCT Pub. No.: WO2018/137784
PCT Pub. Date: Aug. 2, 2018

(65) Prior Publication Data
US 2019/0373512 A1 Dec. 5, 2019

(51) Int. Cl.
*H04W 28/24* (2009.01)
*H04W 28/02* (2009.01)
(Continued)

(52) U.S. Cl.
CPC ....... *H04W 28/24* (2013.01); *H04W 28/0247* (2013.01); *H04W 28/12* (2013.01);
(Continued)

(58) Field of Classification Search
CPC ............. H04L 41/5045; H04L 41/5051; H04L 41/5087; H04L 47/2425; H04L 67/1002;
(Continued)

(56) References Cited

U.S. PATENT DOCUMENTS 7,630,314 B2 * 12/2009 Dos Remedios ....... H04L 47/70
370/464
2010/0291943 A1 * 11/2010 Mihaly ............... H04L 67/1031
455/450
(Continued)

FOREIGN PATENT DOCUMENTS

| WO | 2014133429 A1 | 9/2014 |
| WO | 2015067820 A1 | 5/2015 |
| WO | 2016202358 A1 | 12/2016 |

OTHER PUBLICATIONS

3rd Generation Partnership Project, "3rd Generation Partnership Project; Technical Specification Group Core Network and Terminals; Domain Name System Procedures; Stage 3 (Release 14)", Technical Specification, 3GPP TS 29.303 V14.0.0, Sep. 1, 2016, pp. 1-69, 3GPP.
(Continued)

*Primary Examiner* — Khaled M Kassim
*Assistant Examiner* — Kai Chang
(74) *Attorney, Agent, or Firm* — Christopher & Weisberg, P.A.

(57) ABSTRACT

A method (100) for managing resource usage across domains in a communication network is disclosed. The communication network comprises a radio access domain, a core domain and a transport domain providing connectivity between the radio access domain and the core domain. The method comprises receiving from the core domain an indication of load status of gateway nodes in the core domain (110), receiving from the transport domain an indication of load status of transport resources in the transport domain
(Continued)

(120), normalising across the core and transport domain a cost of using resources in each domain (130), calculating, on the basis of the normalised costs, optimal chains of resources in the core and transport domains for providing a service from different radio access nodes to different possible Access Point Names (APNs) (140), and sending to the core and transport domains information about the calculated optimal resource chains (150). Also disclosed are methods for managing resource usage in a core domain, a transport domain and a radio access domain of a communication network, together with cross domain, core domain, transport domain and radio access domain control elements.

16 Claims, 10 Drawing Sheets

(51) Int. Cl.
    *H04W 28/12* (2009.01)
    *H04W 36/22* (2009.01)
    *H04W 48/00* (2009.01)
    *H04W 88/12* (2009.01)
    *H04W 88/14* (2009.01)
    *H04W 88/16* (2009.01)
    *H04W 28/08* (2009.01)

(52) U.S. Cl.
    CPC .......... *H04W 36/22* (2013.01); *H04W 48/17* (2013.01); *H04W 88/12* (2013.01); *H04W 88/14* (2013.01); *H04W 88/16* (2013.01); *H04W 28/0804* (2020.05)

(58) Field of Classification Search
    CPC . H04W 28/0247; H04W 28/08; H04W 28/12; H04W 28/16; H04W 28/24; H04W 36/22; H04W 48/17; H04W 88/12; H04W 88/14; H04W 88/16
    See application file for complete search history.

(56) References Cited

U.S. PATENT DOCUMENTS

| | | | |
|---|---|---|---|
| 2013/0163424 A1 | 6/2013 | Goerke et al. | |
| 2013/0227146 A1* | 8/2013 | Wang | H04L 47/724 709/226 |
| 2014/0003233 A1* | 1/2014 | Rune | H04W 28/085 370/230 |
| 2015/0103665 A1* | 4/2015 | Kaippallimalil | H04W 76/12 370/235 |
| 2015/0189557 A1* | 7/2015 | Touati | H04W 36/0066 370/332 |
| 2016/0127169 A1* | 5/2016 | Rosa de Sousa Teixeira | H04L 47/828 370/216 |
| 2016/0165484 A1* | 6/2016 | Cui | H04L 43/08 370/235 |
| 2017/0019811 A1* | 1/2017 | Parulkar | H04W 28/0247 |
| 2017/0135003 A1* | 5/2017 | Suarez | H04W 36/0085 |
| 2017/0149665 A1* | 5/2017 | Yousaf | H04L 47/28 |
| 2017/0264488 A1* | 9/2017 | Ben Ami | H04L 67/34 |
| 2018/0077024 A1* | 3/2018 | Zhang | H04L 63/0272 |
| 2018/0077056 A1* | 3/2018 | Gopisetty | H04L 45/42 |
| 2018/0184311 A1* | 6/2018 | Fiaschi | H04W 24/02 |
| 2019/0114200 A1* | 4/2019 | Lee | G06F 8/34 |
| 2019/0253930 A1* | 8/2019 | Senju | G06F 9/45558 |
| 2019/0313286 A1* | 10/2019 | Stumpert | H04L 29/0653 |

OTHER PUBLICATIONS

3rd Generation Partnership Project, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 14)", Technical Specification, 3GPP TS 29.274 V14.1.0, Sep. 1, 2016, pp. 1-364, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14)", Technical Specification, 3GPP TS 36.300 V14.0.0, Sep. 1, 2016, pp. 1-314, 3GPP.

3rd Generation Partnership Project, "3rd Generation Partnership Project; Technical Specification Group Core Network and Terminals; Numbering, Addressing and Identification (Release 14)", Technical Specification, 3GPP TS 23.003 V14.1.0, Sep. 1, 2016, pp. 1-103, 3GPP.

* cited by examiner

METHODS AND APPARATUS FOR MANAGING RESOURCE USAGE ACROSS DOMAINS IN A COMMUNICATION NETWORK

TECHNICAL FIELD

The present disclosure relates to methods and apparatus for managing resource usage across and within domains in a communication network. The present disclosure also relates to a computer program configured to carry out methods for managing resource usage across and within domains in a communication network.

BACKGROUND

A mobile user equipment (UE) may connect to a communication network using appropriate radio resources. The selection of such resources may be managed differently in different networks, and is discussed below with reference to a 3GPP communication network, and particularly with reference to a Long Term Evolution (LTE) network. While the architecture and terminology of the discussion below are specific to LTE, the concepts discussed are equally applicable to other networks including WCDMA (3G) and the emerging 5G.

3GPP Technical Specification (TS) 36.300 (E-UTRAN Overall Description) defines Connection Mobility Control (CMC), which defines the radio resources that must be used by a mobile UE. A resource calculation is performed during cell reselection in idle mode and during handover in connected mode. The calculation is normally based on radio signal characteristics, ensuring that the UE will attach to the cell with the best radio signal strength and/or quality. Some more advanced techniques also include load balancing considerations, enabling better distribution of user traffic among neighbouring cells.

FIG. 1 illustrates a UE 2 which may attach to cells provisioned by either of eNodeBs 4 or 6. The selected eNodeB continues the UE communication towards the Evolved Packet Core (EPC) via an S1 interface to a Serving Gateway (SGW) 8. The S1 interface is transported over a Mobile Backhauling Network (MBH).

Once an appropriate eNodeB for a particular UE has been determined, the selected eNodeB must connect to the relevant EPC nodes (such as the SGW and Packet Data Network Gateway (PGW)). This selection is normally controlled in LTE by the Mobility Management Entity (MME). TS 29.303 (DNS Procedures) describes how a Domain Name System supports the communication network in the discovery and selection of EPC gateways starting from the UE service request (APN) and its attachment Radio Access Network (RAN) nodes, which may be Identified by a Tracking Area Identity (TAI) and/or an eNodeB identity. TS 23.003 (Numbering, addressing and identification) specifies the entity names to allow this mechanism.

Clause 4A of TS 29.303303 (DNS Procedures) adds mechanisms to support load control in the PGW and SGW selection. The Load Control solution is an optional feature conceived to overcome the GTP-C overload problem (when the number of incoming requests exceeds the maximum request throughput supported by the receiving GTP-C entity, that is when the internal available resources of the GTP-C entity, such as processing power or memory, are not sufficient to serve the number of incoming requests). The Load Control solution is described in TS 29.274 (GTPv2-C), clause 12.2 and enables a better usage of the processing power of EPC gateways.

The interface between the selected eNodeB and selected EPC gateways is carried over the MBH, as discussed above. The MBH is comprised of a plurality of individual links and nodes which may assembled to form transport paths for the transport of traffic between eNodeBs and gateways. Each individual transport link and node has its own transport capacity which, when exceeded, may lead to congestion and/or bottlenecks in certain parts of the MBH. In addition, failure of individual nodes or links may result in disruption to traffic on all paths including the failed link or node, and consequent traffic redirection may contribute to congestion issues in other parts of the MBH.

On the basis of the above discussions, three domains may be identified in a communication network, each having specific domain resources, the use of which should be optimised to maximise the performance of the domain. The three domains are:
the Radio Access Network (RAN), in which with radio signal strength/quality and radio channel occupancy are the resources to be optimised;
the Transport Network (MBH), in which transport capacity is the resource to be optimised; and
the Packet Core (EPC), in which the computational load of individual gateways is the resource to be optimised.

If all the optional techniques available according to current standards are used (which is not always the case in existing deployments), the RAN parameters and the EPC load are optimised independently. However, conditions in each of the three domains may impact upon the overall performance experienced by a user, and in some cases, a sub-optimal resource allocation in one domain could enable avoidance of significant difficulties in another domain, resulting in an improved overall service experienced by a user. Resource allocation in the different domains of a communication network thus remains an ongoing challenge for network operators.

SUMMARY

According to a first aspect of the present disclosure, there is provided a method for managing resource usage across domains in a communication network, the communication network comprising a radio access domain, a core domain and a transport domain providing connectivity between the radio access domain and the core domain. The method comprises receiving from the core domain an indication of load status of gateway nodes in the core domain, receiving from the transport domain an indication of load status of transport resources in the transport domain, and normalising across the core and transport domain a cost of using resources in each domain. The method further comprises calculating, on the basis of the normalised costs, optimal chains of resources in the core and transport domains for providing a service from different radio access nodes to different possible Access Point Names, (APNs), and sending to the core and transport domains information about the calculated optimal resource chains.

According to examples of the present disclosure, receiving indications from the core and transport domains may comprise receiving the indications from a core domain control function and a transport domain control function, which control functions may be Virtualised Network Functions and may be realised in dedicated controllers or in existing nodes in the core and transport domains.

According to examples of the present disclosure, the load status of the gateway nodes may be a computational load status, and the load status of the transport resources may be a resource capacity status.

According to examples of the present disclosure, calculating optimal chains of resources may comprise calculating an optimal resource chain in the core and transport domains for each combination of radio access node, APN and Service Level Agreement (SLA) which may apply to the service being provided.

According to examples of the present disclosure, the indication of load status of gateway nodes in the core domain may comprise a core domain cost of using each gateway node in the core domain.

According to examples of the present disclosure, the indication of load status of the transport resources in the transport domain may comprise at least one of a transport domain cost of using individual transport resources in the transport domain, and/or a transport domain cost of using at least partial paths of transport resources through the transport domain.

According to examples of the present disclosure, individual transport resources may comprise transport links.

According to examples of the present disclosure, each transport domain cost of using at least a partial path of transport resources through the transport domain may further comprise a capability of the at least partial path.

According to examples of the present disclosure, sending to the core and transport domains information about the calculated optimal resource chains may comprise sending to the core domain an identification of gateway nodes to be used by the core domain for providing a service from different radio access nodes to different possible Access Point Names (APNs).

According to examples of the present disclosure, sending to the core and transport domains information about the calculated optimal resource chains may comprise sending to the core domain an identification of at least one gateway node to be used by the core domain for each combination of radio access node, APN and Service Level Agreement (SLA) which may apply to the service being provided.

According to examples of the present disclosure, the identification of gateway nodes may comprise an identification of at least one packet gateway node and of at least one serving gateway node.

According to examples of the present disclosure, sending to the core and transport domains information about the calculated optimal resource chains may comprise sending to the transport domain at least partial paths of transport resources through the transport domain to be used by the transport domain for providing a service from different radio access nodes to different possible gateway nodes in the core domain.

According to examples of the present disclosure, sending to the core and transport domains information about the calculated optimal resource chains may comprise sending to the transport domain at least a partial path of transport resources through the transport domain to be used by the transport domain for each combination of radio access node, core domain gateway node and Service Level Agreement (SLA) which may apply to the service being provided.

According to examples of the present disclosure, the method may further comprise sending to the radio access domain information about the calculated optimal resource chains.

According to examples of the present disclosure, sending to the radio access domain information about the calculated optimal resource chains may comprise sending to the radio access domain a normalised cost associated with each optimal resource chain.

According to examples of the present disclosure, the normalised cost may for example comprise the calculated normalised cost for the optimal resource chain for each combination of radio access node, APN and SLA which may apply to the service being provided.

According to examples of the present disclosure, the method may for example be implemented by a Cross Domain Function, which function may for example be a Virtualised Network Function, and may be realised in a dedicated module or element such as a Cross Domain Controller or may be realised within a module or element located within any one of the network domains. Examples of such modules or elements comprise core domain elements such as gateways, a Mobility Management Entity (in a 3GPP network), or a Domain Name System, transport domain elements such as routers and radio access domain elements such as basestations (eNodeBs in 3GPP networks).

According to another aspect of the present disclosure, there is provided a method for managing resource usage in a core domain of a communication network, the communication network comprising the core domain, a radio access domain and a transport domain providing connectivity between the radio access domain and the core domain. The method comprises sending to a cross domain function an indication of load status of gateway nodes in the core domain, receiving from the cross domain function information about optimal chains of resources in the core and transport domains for providing a service from different radio access nodes to different possible Access Point Names (APNs), and selecting a gateway node for a new connectivity request according to the received information about optimal resource chains.

According to examples of the present disclosure, selecting a gateway may comprise selecting a pair of gateways, and for example in a 3GPP network may comprise selecting a SGW/PGW pair.

According to examples of the present disclosure, the indication of load status of gateway nodes in the core domain may comprise a core domain cost of using each gateway node in the core domain.

According to examples of the present disclosure, the method may further comprise calculating a core domain cost of using each gateway node in the core domain, and calculating a core domain cost of using each gateway node in the core domain may comprise calculating a core domain cost on the basis of at least one of minimising total resource usage, minimising bottlenecks in the core domain and/or prediction of future resource usage.

According to examples of the present disclosure, the method may further comprise receiving load status information from gateway nodes in the core domain. Core network cost calculations may be based on the received load status information.

According to examples of the present disclosure, receiving from the cross domain function information about optimal chains of resources in the core and transport domains may comprise receiving from the cross domain function an identification of gateway nodes to be used by the core domain for providing a service from different radio access nodes to different possible Access Point Names (APNs).

According to examples of the present disclosure, receiving from the cross domain function information about optimal chains of resources in the core and transport domains may comprise receiving from the cross domain function an identification of at least one gateway node to be used by the core domain for each combination of radio access node, APN and Service Level Agreement (SLA) which may apply to the service being provided.

According to examples of the present disclosure, the method may further comprise storing the indication of a gateway node.

According to examples of the present disclosure, the indication may for example be an indication of a pair of gateway nodes, such as a serving and packet gateway pair. The indication may be stored together with the combination of radio access node, APN and SLA, such that each combination of radio access node, APN and SLA is associated with an identified serving and packet gateway pair.

According to examples of the present disclosure, the method may for example be implemented by a Core Domain Function, which function may for example be a Virtualised Network Function, and may be realised in a dedicated module or element such as a Packet Core Domain Controller, or may be realised within existing core domain elements such as gateways, a Mobility Management Entity (in a 3GPP network), or a Domain Name System.

According to another aspect of the present disclosure, there is provided a method for managing resource usage in a transport domain of a communication network, the communication network comprising a core domain, a radio access domain and the transport domain providing connectivity between the radio access domain and the core domain. The method comprises sending to a cross domain function an indication of load status of transport resources in the transport domain, receiving from the cross domain function information about optimal chains of resources in the core and transport domains for providing a service from different radio access nodes to different possible Access Point Names (APNs), and selecting transport resources for a new connectivity request according to the received information about optimal resource chains.

According to examples of the present disclosure, the indication of load status of the transport resources in the transport domain may comprise at least one of a transport domain cost of using individual transport resources in the transport domain and/or a transport domain cost of using at least partial paths of transport resources through the transport domain.

According to examples of the present disclosure, individual transport resources may comprise transport links.

According to examples of the present disclosure, each transport domain cost of using at least a partial path of transport resources through the transport domain may further comprise a capability of the at least partial path.

According to examples of the present disclosure, the method may further comprise calculating at least one of a transport domain cost of using individual transport resources in the transport domain and/or a transport domain cost of using at least partial paths of transport resources through the transport domain. According to examples of the present disclosure, calculating a transport domain costs may comprise calculating a transport domain cost on the basis of at least one of minimising total resource usage, minimising bottlenecks in the transport domain and/or prediction of future resource usage.

According to examples of the present disclosure, the method may further comprise receiving load status information from router nodes in the transport network. Transport network cost calculations may be based on the received load status information.

According to examples of the present disclosure, receiving from the cross domain function information about optimal chains of resources in the core and transport domains for providing a service from different radio access nodes to different possible APNs may comprise receiving from the cross domain function at least partial paths of transport resources through the transport domain to be used by the transport domain for providing a service from different radio access nodes to different possible gateway nodes in the core domain.

According to examples of the present disclosure, receiving from the cross domain function information about optimal chains of resources in the core and transport domains may comprise receiving from the cross domain function at least a partial path of transport resources through the transport domain to be used by the transport domain for each combination of radio access node, core domain gateway node and Service Level Agreement (SLA) which may apply to the service being provided.

According to examples of the present disclosure, the SLA may apply to a service between a UE and the APN. The requirements of the SLA may therefore be adapted for use in the transport domain, in order to take account of actions in adjacent domains. For example latency requirements specified in the SLA may apply to transmission from the UE to the specified APN, and may therefore be reduced for use in the transport domain to take account of latency in the radio access and core domains.

According to examples of the present disclosure, the method may for example be implemented by a Transport Domain Function, which function may for example be a Virtualised Network Function, and may be realised in a dedicated module or element such as a Transport Domain Controller, or may be realised directly within transport domain routers for example as part of a distributed control plane.

According to another aspect of the present disclosure, there is provided a method for managing resource usage in a radio access domain of a communication network, the communication network comprising the radio access domain, a core domain and a transport domain providing connectivity between the radio access domain and the core domain. The method comprises receiving from a cross domain function information about optimal chains of resources in the core and transport domains for providing a service from different radio access nodes to different possible Access Point Names (APNs) and selecting a radio access node for a new connectivity request at least partially on the basis of the received information.

According to examples of the present disclosure, receiving from the cross domain function information about optimal chains of resources in the core and transport domains may comprise receiving from the cross domain function a cost associated with each optimal resource chain, wherein the cost is normalised across the core and transport domains.

According to examples of the present disclosure, receiving from the cross domain function information about optimal chains of resources in the core and transport domains may comprise receiving from the cross domain function a cost associated with an optimal resource chain in the core and transport domains for each combination of radio access node, APN and Service Level Agreement (SLA) which may apply to the service being provided.

According to examples of the present disclosure, selecting a radio access node for a new connectivity request at least partially on the basis of the received information may comprise selecting a radio access node on the basis of a cost associated with the optimal resource chain for providing a service from the radio access node to an APN specified in the new connectivity request and radio signal characteristics associated with the radio access node.

According to examples of the present disclosure, selecting a radio access node for a new connectivity request at least partially on the basis of the received information may comprise weighting the radio signal characteristics of the radio access node with the cost associated with the optimal resource chain.

According to examples of the present disclosure, selecting a radio access node may comprise combining the cost associated with the optimal resource chain and the radio signal characteristics according to example methods disclosed in US provisional patent application U.S. 62/417,655.

According to examples of the present disclosure, the method may for example be implemented by a Radio Access Domain Function, which function may for example be a Virtualised Network Function, and may be realised in a dedicated module or element such as a Radio Access Domain Controller. In other examples, the Radio Access Domain Function may be realised directly within basestations or in an element of the core domain, such as an MME in a 3GPP network.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a cross domain control element for managing resource usage across domains in a communication network, the communication network comprising a radio access domain, a core domain and a transport domain providing connectivity between the radio access domain and the core domain. The cross domain control element is adapted to receive from the core domain an indication of load status of gateway nodes in the core domain to receive from the transport domain an indication of load status of transport resources in the transport domain and to normalise across the core and transport domain a cost of using resources in each domain. The cross domain control element is further adapted to calculate, on the basis of the normalised costs, optimal chains of resources in the core and transport domains for providing a service from different radio access nodes to different possible Access Point Names (APNs) and to send to the core and transport domains information about the calculated optimal resource chains.

According to another aspect of the present disclosure, there is provided a cross domain control element for managing resource usage across domains in a communication network, the communication network comprising a radio access domain, a core domain and a transport domain providing connectivity between the radio access domain and the core domain. The cross domain control element comprises a processor and a memory, the memory containing instructions executable by the processor such that the cross domain control element is operable to receive from the core domain an indication of load status of gateway nodes in the core domain receive from the transport domain an indication of load status of transport resources in the transport domain, and normalise across the core and transport domain a cost of using resources in each domain. The cross domain control element is further operable to calculate, on the basis of the normalised costs, optimal chains of resources in the core and transport domains for providing a service from different radio access nodes to different possible Access Point Names (APNs) and send to the core and transport domains information about the calculated optimal resource chains.

According to another aspect of the present disclosure, there is provided a cross domain control element for managing resource usage across domains in a communication network, the communication network comprising a radio access domain, a core domain and a transport domain providing connectivity between the radio access domain and the core domain. The cross domain control element comprises a receiving module for receiving from the core domain an indication of load status of gateway nodes in the core domain, and for receiving from the transport domain an indication of load status of transport resources in the transport domain, a cost module for normalising across the core and transport domain a cost of using resources in each domain, a processing module for calculating, on the basis of the normalised costs, optimal chains of resources in the core and transport domains for providing a service from different radio access nodes to different possible Access Point Names (APNs) and a transmitting module for sending to the core and transport domains information about the calculated optimal resource chains.

According to examples of the present disclosure, the cross domain control element may be realised as a dedicated module or element such as a Cross Domain Controller or may be realised within a module or element located within any one of the network domains. Examples of such modules or elements comprise core domain elements such as gateways, a Mobility Management Entity (in a 3GPP network), or a Domain Name System, transport domain elements such as routers and radio access domain elements such as basestations (eNodeBs in 3GPP networks).

According to another aspect of the present disclosure, there is provided a core domain control element for managing resource usage in a core domain of a communication network, the communication network comprising the core domain, a radio access domain and a transport domain providing connectivity between the radio access domain and the core domain. The core domain control element is adapted to send to a cross domain function an indication of load status of gateway nodes in the core domain, to receive from the cross domain function information about optimal chains of resources in the core and transport domains for providing a service from different radio access nodes to different possible Access Point Names (APNs) and to select a gateway node for a new connectivity request according to the received information about optimal resource chains.

According to another aspect of the present disclosure, there is provided a core domain control element for managing resource usage in a core domain of a communication network, the communication network comprising the core domain, a radio access domain and a transport domain providing connectivity between the radio access domain and the core domain. The core domain control element comprises a processor and a memory, the memory containing instructions executable by the processor such that the core domain control element is operable to send to a cross domain function an indication of load status of gateway nodes in the core domain, receive from the cross domain function information about optimal chains of resources in the core and transport domains for providing a service from different radio access nodes to different possible Access Point Names (APNs) and select a gateway node for a new connectivity request according to the received information about optimal resource chains.

According to another aspect of the present disclosure, there is provided a core domain control element for managing resource usage in a core domain of a communication network, the communication network comprising the core domain, a radio access domain and a transport domain providing connectivity between the radio access domain and the core domain. The core domain control element comprises a transmission module for sending to a cross domain function an indication of load status of gateway nodes in the core domain, a receiving module for receiving from the cross domain function information about optimal chains of resources in the core and transport domains for providing a service from different radio access nodes to different possible Access Point Names (APNs) and a processing module for selecting a gateway node for a new connectivity request according to the received information about optimal resource chains.

According to examples of the present disclosure, the core domain control element may be realised in a dedicated module or element such as a Packet Core Domain Controller, or may be realised within existing core domain elements such as gateways, a Mobility Management Entity (in a 3GPP network), or a Domain Name System.

According to another aspect of the present disclosure, there is provided a transport domain control element for managing resource usage in a transport domain of a communication network, the communication network comprising a core domain, a radio access domain and the transport domain providing connectivity between the radio access domain and the core domain. The transport domain control element is adapted to send to a cross domain function an indication of load status of transport resources in the transport domain, to receive from the cross domain function information about optimal chains of resources in the core and transport domains for providing a service from different radio access nodes to different possible Access Point Names (APNs) and to select transport resources for a new connectivity request according to the received information about optimal resource chains.

According to another aspect of the present disclosure, there is provided a transport domain control element for managing resource usage in a transport domain of a communication network, the communication network comprising a core domain, a radio access domain and the transport domain providing connectivity between the radio access domain and the core domain. The transport domain control element comprises a processor and a memory, the memory containing instructions executable by the processor such that the transport domain control element is operable to send to a cross domain function an indication of load status of transport resources in the transport domain, receive from the cross domain function information about optimal chains of resources in the core and transport domains for providing a service from different radio access nodes to different possible Access Point Names (APNs) and select transport resources for a new connectivity request according to the received information about optimal resource chains.

According to another aspect of the present disclosure, there is provided a transport domain control element for managing resource usage in a transport domain of a communication network, the communication network comprising a core domain, a radio access domain and the transport domain providing connectivity between the radio access domain and the core domain. The transport domain control element comprises a transmission module for sending to a cross domain function an indication of load status of transport resources in the transport domain, a receiving module for receiving from the cross domain function information about optimal chains of resources in the core and transport domains for providing a service from different radio access nodes to different possible Access Point Names (APNs) and a processing module for selecting transport resources for a new connectivity request according to the received information about optimal resource chains.

According to examples of the present disclosure, the transport domain control element may be realised in a dedicated module or element such as a Transport Domain Controller, or may be realised directly within transport domain routers as part of a distributed control plane.

According to another aspect of the present disclosure, there is provided a radio access domain control element for managing resource usage in a radio access domain of a communication network, the communication network comprising the radio access domain, a core domain and a transport domain providing connectivity between the radio access domain and the core domain. The radio access domain control element is adapted to receive from a cross domain function information about optimal chains of resources in the core and transport domains for providing a service from different radio access nodes to different possible Access Point Names (APNs) and to select a radio access node for a new connectivity request at least partially on the basis of the received information.

According to another aspect of the present disclosure, there is provided a radio access domain control element for managing resource usage in a radio access domain of a communication network, the communication network comprising the radio access domain, a core domain and a transport domain providing connectivity between the radio access domain and the core domain. The radio access domain control element comprises a processor and a memory, the memory containing instructions executable by the processor such that the radio access domain control element is operable to receive from a cross domain function information about optimal chains of resources in the core and transport domains for providing a service from different radio access nodes to different possible Access Point Names (APNs) and to select a radio access node for a new connectivity request at least partially on the basis of the received information.

According to another aspect of the present disclosure, there is provided a radio access domain control element for managing resource usage in a radio access domain of a communication network, the communication network comprising the radio access domain, a core domain and a transport domain providing connectivity between the radio access domain and the core domain. The radio access domain control element comprises a receiving module for receiving from a cross domain function information about optimal chains of resources in the core and transport domains for providing a service from different radio access nodes to different possible Access Point Names (APNs) and a processing module for selecting a radio access node for a new connectivity request at least partially on the basis of the received information.

According to examples of the present disclosure, the radio access domain control element may be realised in a dedicated module or element such as a Radio Access Domain Controller or may be realised directly within basestations or in an element of the core domain, such as an MME in a 3GPP network.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Examples of the present disclosure provide methods enabling a globalised optimisation of resources across multiple domains of a communication network. The methods of the present disclosure may be conducted at a cross domain control function, and at individual domain control functions, which functions may be Virtualised Network Functions (VNFs), and may be realised in a range of different network nodes or other entities, as discussed in further detail below.

Figure 1:
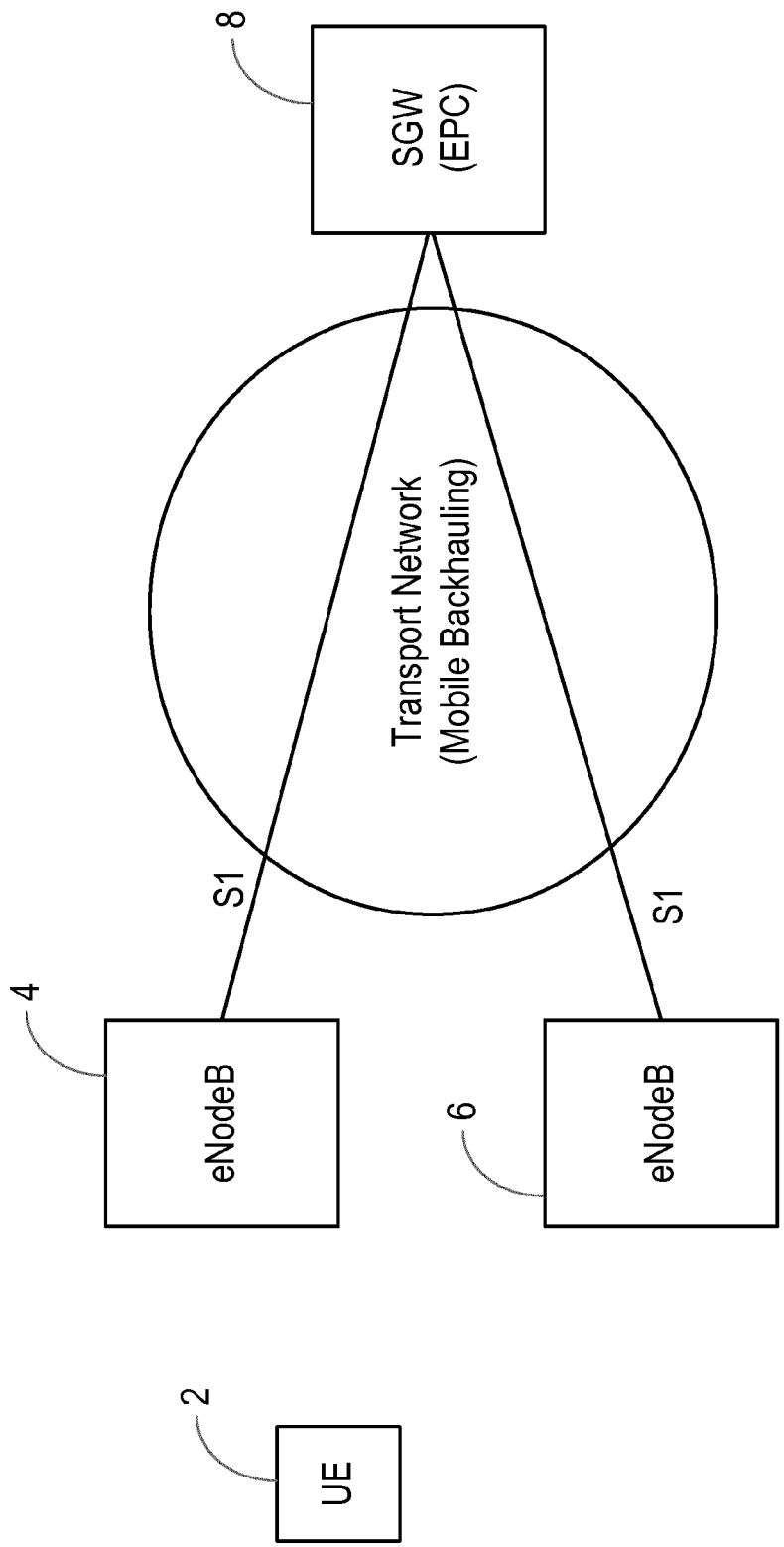
FIG. 1 illustrates elements of a communication network.
Figure 2:
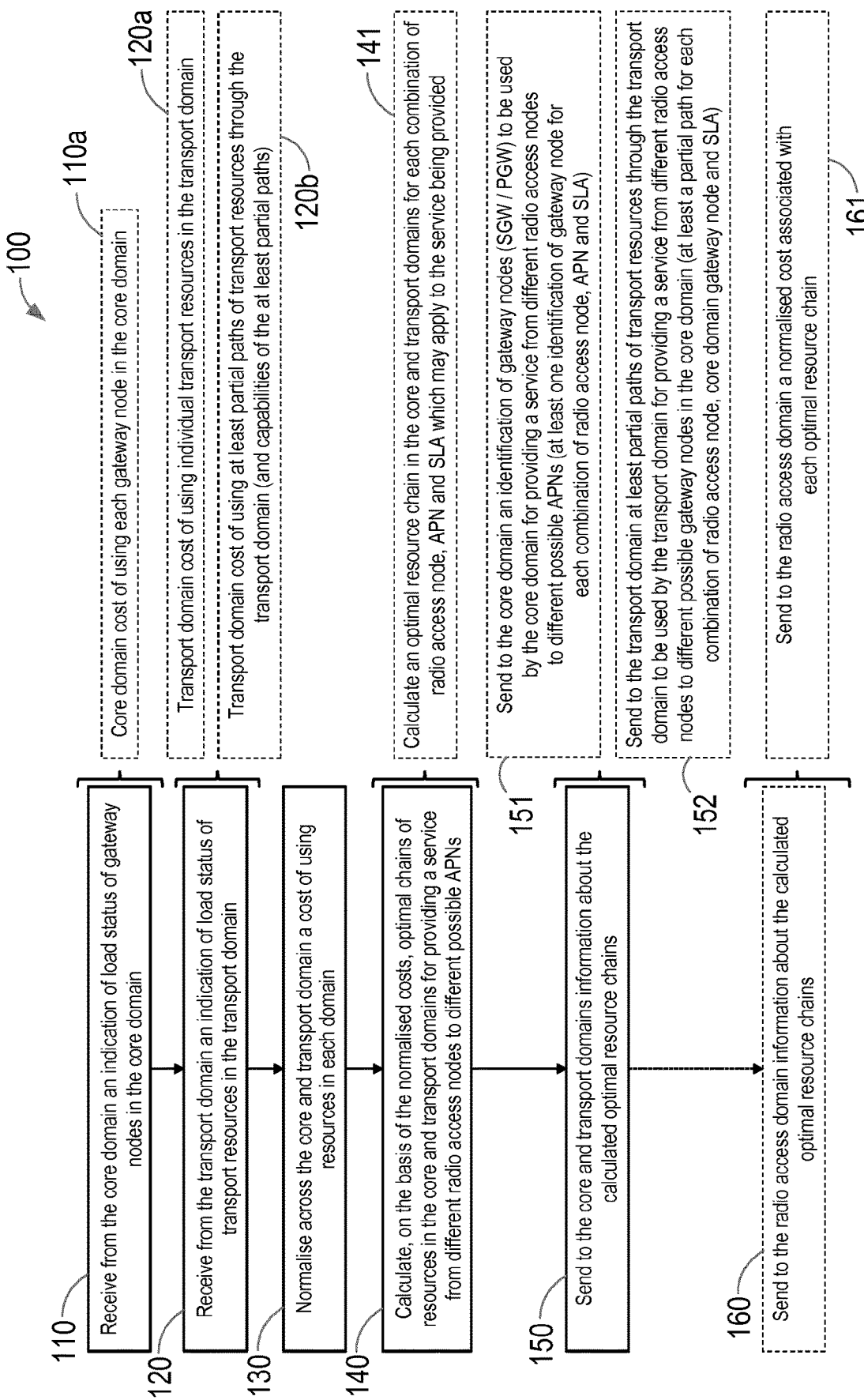
FIG. 2 is a flow chart illustrating process steps in a method for managing resource usage across domains in a communication network.

FIG. 2 illustrates process steps in a method 100 for managing resource usage across domains in a communication network. The communication network comprises a radio access domain, a core domain and a transport domain providing connectivity between the radio access domain and the core domain. The method 100 of FIG. 2 may for example be implemented by a cross domain control function, which function may as discussed above be a VNF, and may be realised in a dedicated module or element such as a Cross Domain Controller or may be realised within a module or element located within any one of the network domains. Examples of such modules or elements comprise core domain elements such as gateways, a Mobility Management Entity (in a 3GPP network), or a Domain Name System, transport domain elements such as routers and radio access domain elements such as basestations (eNodeBs in 3GPP networks). In further examples, the cross domain control function may be co-located with a dedicated domain control function, as discussed below with reference to FIGS. 3 to 5.

Referring to FIG. 2, in a first step 110, the cross domain control function receives from the core domain of the network an indication of load status of gateway nodes in the core domain. The load status may for example be a computational load status. As illustrated at 110*a*, the indication of load status may be a core domain cost of using each gateway node in the core domain. The core domain cost may be set such that the cost of using a particular gateway increases as the computational resources (including memory and processing capacity) of the gateway approach saturation. The setting of core domain costs is discussed in further detail with reference to FIG. 3 below.

In step 120, the cross domain control function receives from the transport domain of the communication network an indication of load status of transport resources in the transport domain. The load status of the transport resources may for example be a resource capacity status. As illustrated at 120*a*, the indication of load status may be a transport domain cost of using individual transport resources, such as transport links, in the transport domain. In further examples, as illustrated at 220*b*, the indication of load status may additionally or alternatively be a transport domain cost of using at least partial paths of transport resources through the transport domain. Each transport domain cost of using at least a partial path of transport resources through the transport domain may further comprise a capability of the at least partial path. The transport domain cost may be set such that the cost of using a particular resource or at least partial path increases as the remaining available capacity of the resource or path reduces. The setting of transport domain costs is discussed in further detail with reference to FIG. 4 below.

Following steps 110 and 120, the cross domain control function has received information about the status of the packet core and transport domains. This information may then be processed to enable comparison of costs across the two different domains. Referring again to FIG. 2, in step 130, the cross domain control function normalises across the core and transport domain a cost of using resources in each domain. While the resource usage definition is heterogeneous, including computational load on core domain gateways and link or path capacity in transport domain resources, the resource costs are normalised in step 130 in such a manner as to enable comparison of costs of different resources in different domains. The precise cost normalisation functions may be tailored to particular operator needs. For example different domains could be outsourced to different suppliers with different financial costs, which may have a significant impact on overall operating expenditure. Normalisation functions used in normalising costs across the core and transport domains may therefore take such financial cost variations into account in enabling comparison and combination of costs across heterogeneous resources.

In step 140, the cross domain control function calculates, on the basis of the normalised costs, optimal chains of resources in the core and transport domains for providing a service from different radio access nodes to different possible Access Point Names (APNs). This calculation may involve applying a constrained shortest path algorithm to the resources across the two domains (core and transport) to identify specific chains of resources across the two domains that are capable of providing a service between different radio access nodes (for example eNodeBs) to different APNs. In some examples, as illustrated in step 141, step 140 may involve calculating an optimal resource chain in the core and transport domains for each combination of radio access node, APN and Service Level Agreement (SLA) which may apply to the service being provided. Each resource chain may therefore be associated with a triplet of eNodeB (for an LTE network), APN and SLA. The resource chain includes a tunnel path in the transport domain and, in an LTE network, a SGW/PGW pair in the core domain. Other core network nodes may be selected in different types of communication network, according to the particular network architecture.

Once the optimal resource chains have been calculated, the cross domain control function sends to the core and transport domains, in step 150, information about the calculated optimal resource chains. The information sent to each domain may be tailored to the requirements of the particular domain. For example, as illustrated in step 151, the cross domain control function may send to the core domain an identification of gateway nodes to be used by the core domain for providing a service from different radio access nodes to different possible APNs. The cross domain control function may for example send an identification of at least one gateway node, and for example an identification of an SGW/PGW pair, to be used by the core domain for each combination of radio access node, APN and SLA which may apply to the service being provided. When a core domain receives a new request specifying an eNodeB, destination APN and SLA to be respected, the core domain may then simply look up the correct SGW/PGW pair from the information received from the cross domain control function. This action is discussed in further detail below with reference to FIG. 3.

As illustrated in step 152, the cross domain control function may send to the transport domain at least partial paths of transport resources through the transport domain to be used by the transport domain for providing a service from different radio access nodes to different possible gateway nodes in the core domain. The cross domain control function may for example send at least a partial path of transport resources through the transport domain to be used by the transport domain for each combination of radio access node, core domain gateway node and SLA which may apply to the service being provided. When a transport domain receives a new request specifying an origin radio access node and a destination core domain node, together with an SLA specifying constraints to be respected in the transport of traffic for the request, the transport domain may simply look up the correct at least partial path received from the cross domain control function. This action is discussed in further detail below with reference to FIG. 4.

Referring still to FIG. 2, the cross domain control function may then send to the radio access domain information about the calculated optimal resource chains in step 160. As illustrated in step 161, the cross domain control function may send to the radio access domain a normalised cost associated with each optimal resource chain. The normalised cost may for example comprise the calculated normalised cost for the optimal resource chain for each combination of radio access node, APN and SLA which may apply to the service being provided. This normalised cost may then be taken into account by the radio access domain when considering a radio access node to be assigned to a new request specifying a destination APN and an SLA, as discussed in further detail below with reference to FIG. 5.

The information about the optimal resource chains sent to the different network domains may be updated periodically as network status changes. The frequency with which the information is updated may depend upon network dynamics and may be set and revised for example by a network operator.

Figure 3:
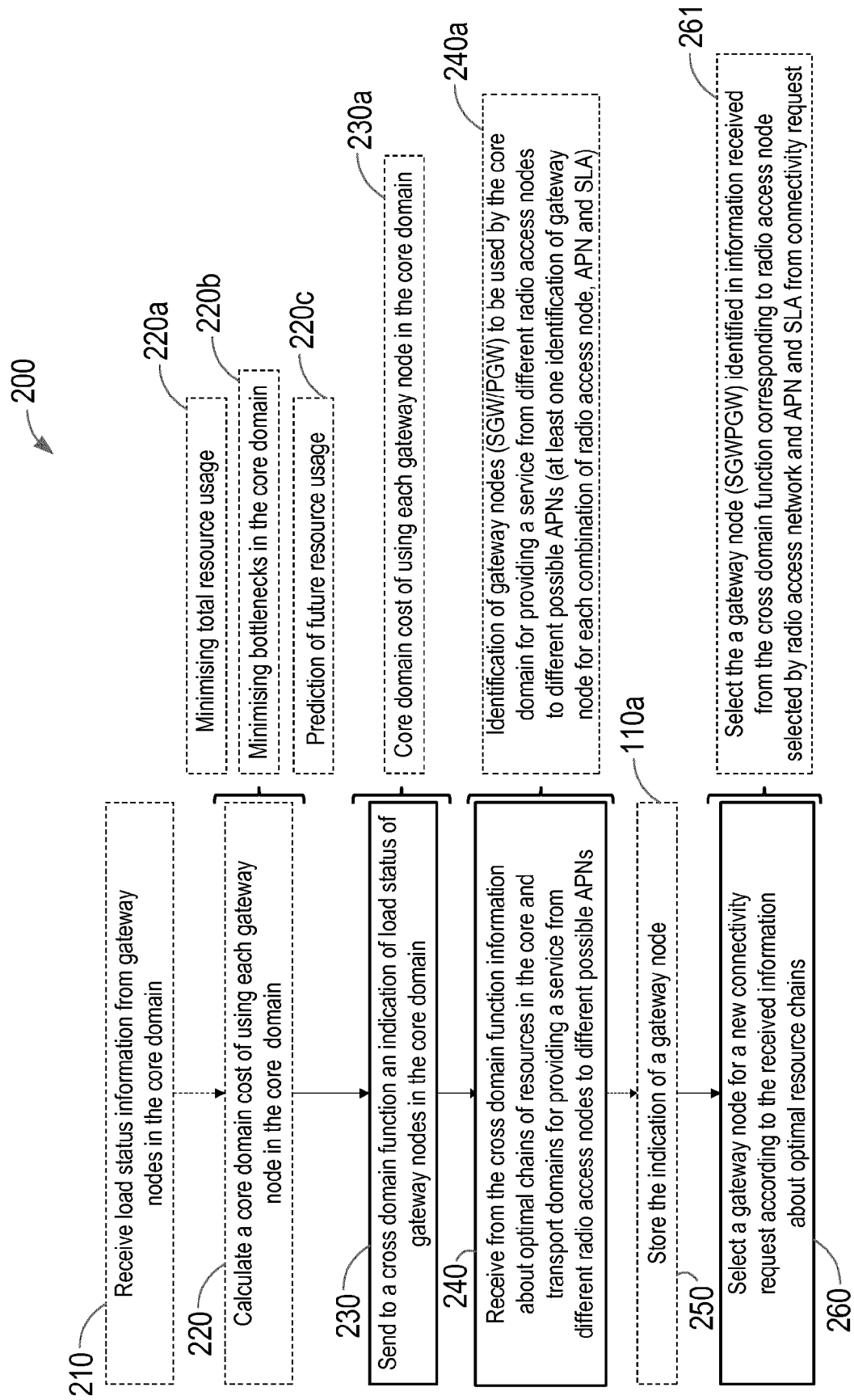
FIG. 3 is a flow chart illustrating process steps in a method for managing resource usage in a core domain of a communication network.

FIG. 3 illustrates process steps in a method 200 for managing resource usage in a core domain in a communication network. The communication network may be the same network as that discussed above with reference to FIG. 2, and may thus comprise the core domain, a radio access domain and a transport domain providing connectivity between the radio access domain and the core domain. The method 200 of FIG. 3 may for example be implemented by a core domain control function, which function may as discussed above be a VNF, and may be realised in a dedicated module or element such as a Core Domain Controller or may be realised within existing core domain elements such as gateways, a Mobility Management Entity (in a 3GPP network), or a Domain Name System.

Referring to FIG. 3, in a first step 210, the core domain control function may receive load status information from gateway nodes in the core domain. In an LTE network, the gateway nodes may be SGWs and PGWs, but other gateway nodes in different types of communication network may also be envisaged. This load status information is not directly used by the core domain control function for gateway selection, but an indication of this information is instead sent to the cross domain control function to enable optimisation of resources across multiple network domains. The load status information may for example be computational load status information, and in step 220, the core domain control function may calculate a core domain cost of using each gateway node in the core domain on the basis of the received load status information. As discussed above, the cost calculated for each gateway node may increase as the computational resources (memory and processor|) of the gateway node approach saturation. In some examples, different aims may be respected in the calculation of costs. In a first example, costs may be calculated so as to minimise overall core domain resource usage, as illustrated in step 220a. In a second example, costs may be calculated so as to minimise bottlenecks in the core domain, as illustrated at step 220b. In a third example, costs may be calculated on the basis of predicted future resource usage, as illustrated in step 220c.

In step 230, the core domain control function sends to a cross domain control function an indication of load status of gateway nodes in the core domain. As illustrated at step 230a, the indication may comprise the core domain cost of using each gateway in the core domain, as calculated in step 220. In step 240, the core domain control function receives from the cross domain control function information about optimal chains of resources in the core and transport domains for providing a service from different radio access nodes to different possible APNs. The information may for example comprise an identification of gateway nodes to be used by the core domain for providing a service from different radio access nodes to different possible APNs, and may comprise an identification of at least one gateway node (for example an SGW/PGW pair) to be used by the core domain for each combination of radio access node, APN and SLA. The core domain control function may store each indication received in step 250. For example, the core domain control function may maintain SGW/PGW tables, with each received indication of an SGW/PGW pair stored against the radio access node, APN, SLA triplet to which it corresponds.

In step 260, the core domain control function selects a gateway node for a new connectivity request according to the received information about optimal resource chains. Step 260 may in some examples comprise, as illustrated in step 261, selecting from the information received from the cross domain control function the gateway or gateway pair corresponding to the APN and SLA from a connectivity request and the radio access node selected by the radio access domain. In LTE, attachment or reselection requests are received from the eNodeB already selected for the request by the radio access domain, and these requests identify both the destination APN and the SLA. The core domain control function does not therefore require any additional information to identify the correct gateway or gateway pair for example from the stored tables discussed above. In some examples, the step of selecting a gateway may comprise causing a gateway to be selected, for example if the gateway selection procedure is hosted in a different node to the core domain control function. For example in LTE, gateway selection is performed by the MME, and while the core domain control function may be realised within an MME, it may also be realised in other core domain nodes, as discussed above.

According to examples of the method 200, the selection of core domain gateways is considerably simplified compared to standard procedures. In LTE, an MME is tasked with selecting core gateways, possibly with the help of a DNS. In contrast, according to examples of the method 200, gateway selection is uniquely determined by the calculations performed by the cross domain control function, and the correct gateway or gateway pair is identified by the triplet of radio access node, APN and SLA from the new connection request.

Figure 4:
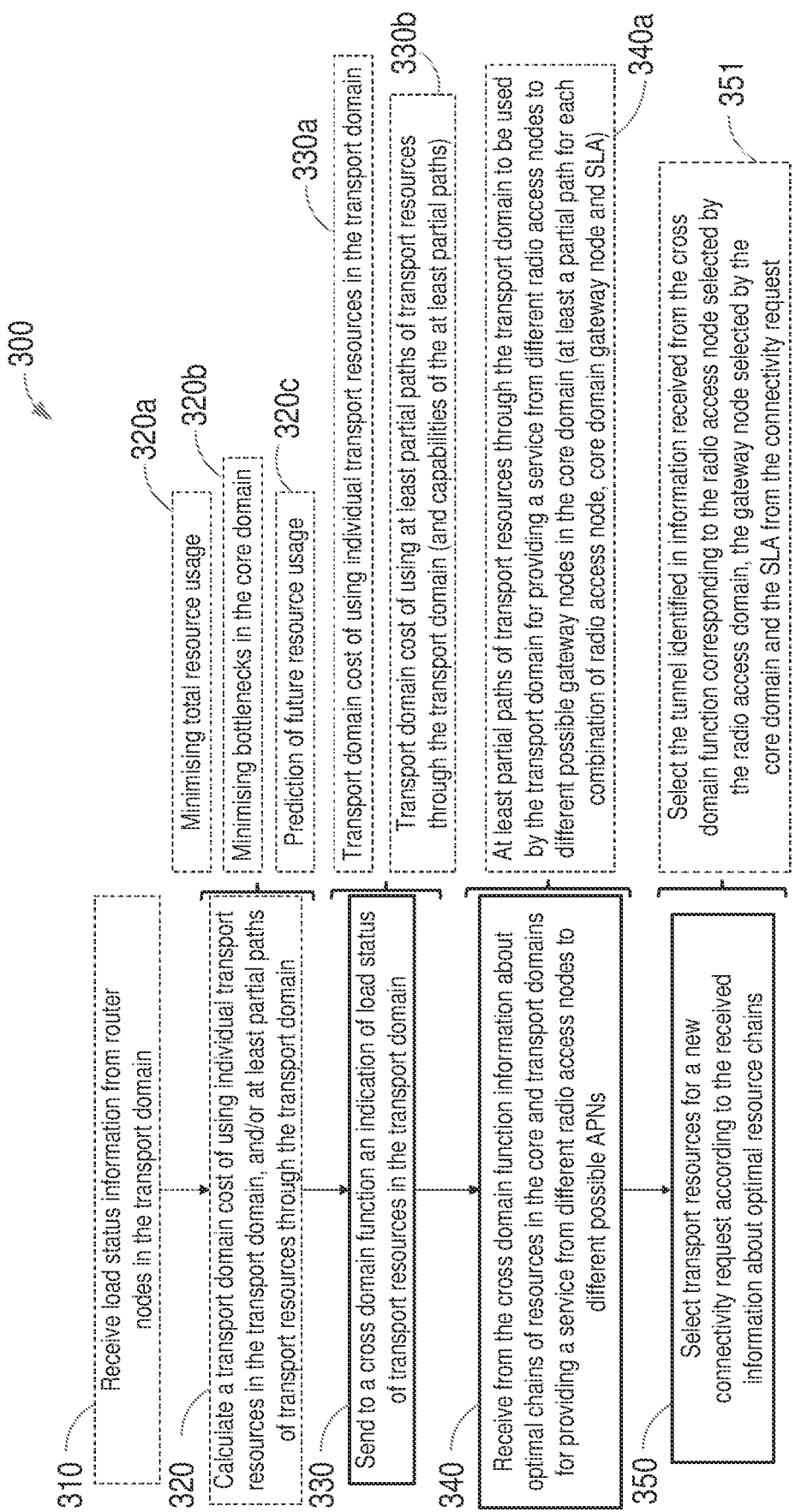
FIG. 4 is a flow chart illustrating process steps in a method for managing resource usage in a transport domain of a communication network.

FIG. 4 illustrates process steps in a method 300 for managing resource usage in a transport domain in a communication network. The communication network may be the same network as that discussed above with reference to FIGS. 2 and 3, and may thus comprise a core domain, a radio access domain and the transport domain providing connectivity between the radio access domain and the core domain. The method 300 of FIG. 4 may for example be implemented by a Transport Domain Function, which function may for example be a Virtualised Network Function, and may be realised in a dedicated module or element such as a Transport Domain Controller, or may be realised directly within transport domain routers for example as part of a distributed control plane. It is envisaged that traffic engineering techniques may be supported by the transport domain, including for example MPLS, SR and PCE/PCEP.

Referring to FIG. 4, in a first step 310, the transport domain function may receive load status information from router nodes in the transport domain. The load status information may indicate the available transport capacity remaining in the links and nodes of the transport domain. In step 320, the transport domain control function may calculate at least one of a transport domain cost of using individual transport resources in the transport domain and/or a transport domain cost of using at least partial paths of transport resources through the transport domain. As discussed above, the cost calculated for each resource or at least partial path may increase as the remaining transport capacity of the resource or path diminishes.

In some examples, different aims may be respected in the calculation of costs. In a first example, costs may be calculated so as to minimise overall transport resource usage, as illustrated in step 320*a*. In this example the cost is simply based on the total amount of resources consumed and so corresponds to the unconstrained shortest path in network routing, which uses the minimal amount of link capacity. In a second example, costs may be calculated so as to minimise bottlenecks in the transport domain, as illustrated at step 320*b*. In this example, the cost associated with a particular link or path dynamically increases with link occupancy, so discouraging link filling, but providing opportunities for future routes and minimising the risk of bottlenecks. In a third example, costs may be calculated on the basis of predicted future resource usage, as illustrated in step 320*c*. If analytics techniques allow the prediction of such future resource usage, costs may be adjusted to be increased on resources expecting high usage. Such costs are thus not universal and should be computed independently for each service to be allocated. In this example, time correlation is highly meaningful and arbitrarily complex heuristics may be defined.

The decision as to whether to calculate costs for individual resources, for at least partial paths or for a combination of resources and paths may be made by a network operator, and may be based upon a decision as to how much of the transport network structure is to be exposed to the cross domain control function. Exposing full detail of the transport domain, and thus providing costs for individual resources, allows for calculation in the cross domain control function of a more optimal resource chain in the transport domain. However, this requires a transfer of a greater quantity of information to the cross domain control function, and the calculation task for the cross domain control function is considerably more complex. Exposing only a simplified representation of the transport domain, including at least partial paths, and thus providing costs for at least partial paths, simplifies the calculation task for the cross domain control function at the risk of the calculation resulting in a sub-optimal identified resource chain. In many practical applications, a combination of individual resources and at least partial paths may allow for a suitable compromise between calculation task complexity and optimising the calculated solution.

In step 330, the transport domain control function sends to the cross domain function an indication of load status of transport resources in the transport domain. As illustrated in steps 330*a* and 330*b*, the load status information may be either or both of the calculated transport domain costs of using individual transport resources in the transport domain and/or at least partial paths of transport resources through the transport domain. If the transport domain control function sends costs associated with at least partial paths, the transport domain control function may also send information about capabilities of the path, to enable the cross domain control function to identify optimal resource chains within the transport domain for services having different transport requirements. In step 340, the transport domain control function receives from the cross domain function information about optimal chains of resources in the core and transport domains for providing a service from different radio access nodes to different possible APNs. As illustrated in step 340*a*, the information about optimal chains of resources in the core and transport domains may comprise at least partial paths of transport resources through the transport domain to be used by the transport domain for providing a service from different radio access nodes to different possible gateway nodes in the core domain. In some examples, the information may comprise at least a partial path of transport resources through the transport domain to be used by the transport domain for each combination of radio access node, core domain gateway node and SLA which may apply to the service being provided. The radio access node and core domain gateway node comprise the end points of the tunnel formed by the at least partial path and the SLA is satisfied by the tunnel.

It will be appreciated that in order to maintain tunnels between different radio access nodes and core domain nodes, the transport domain does not require any core domain or radio access domain information other than the radio access node and core domain node to be used as end points for any particular tunnel. However, the transport domain should be able to differentiate tunnels by SLA, as services having different requirements may need to follow different routes. It will be appreciated that the SLA specified in a service request and used by the cross domain control function in its calculations may apply to a service between a UE and the APN. The requirements of the SLA may therefore be adapted for use in the transport domain, in order to take account of actions in adjacent domains. For example latency requirements specified in the SLA may apply to transmission from the UE to the specified APN, and may therefore be reduced for use in the transport domain to take account of latency in the radio access and core domains.

The route of the tunnel may be totally or partially calculated by the cross domain control function in accordance with the level of detail about the transport domain sent by the transport domain control function in step 330. This routing information is received together with other tunnel information in step 340. If a new route is sent for an already existing tunnel (identified by the same combination of radio access node, core domain gateway node and SLA), the tunnel must be rerouted. If the tunnel is only partially calculated by the cross domain control function, the transport domain control function may calculate the missing segments.

In step 350, the transport domain control function selects transport resources for a new connectivity request according to the received information about optimal resource chains. As illustrated in step 351, this may comprise selecting the tunnel and appropriate routing identified in the information received from the cross domain control function corresponding to the radio access node selected by the radio access domain, the gateway node selected by the core domain and the SLA from the connectivity request. The three elements of tunnel endpoints and SLA enable the transport domain control function to uniquely identify a tunnel specified by the cross domain control function as the optimal tunnel, and so to select that tunnel.

According to examples of the method 300, transport domain routing is considerably simplified compared to standard procedures. Instead of performing network routing for new service requests, according to examples of the method 300, tunnels are already identified in information from the cross domain control function, and tunnel selection is uniquely determined by the triplet of radio access node, core network node and SLA. The transport domain control function may simply be required to complete missing segments of a tunnel in the event that the information about the transport domain exposed to the cross domain control function was not sufficiently compete to allow a full tunnel route to be specified in the information received from the cross domain control function.

Figure 5:
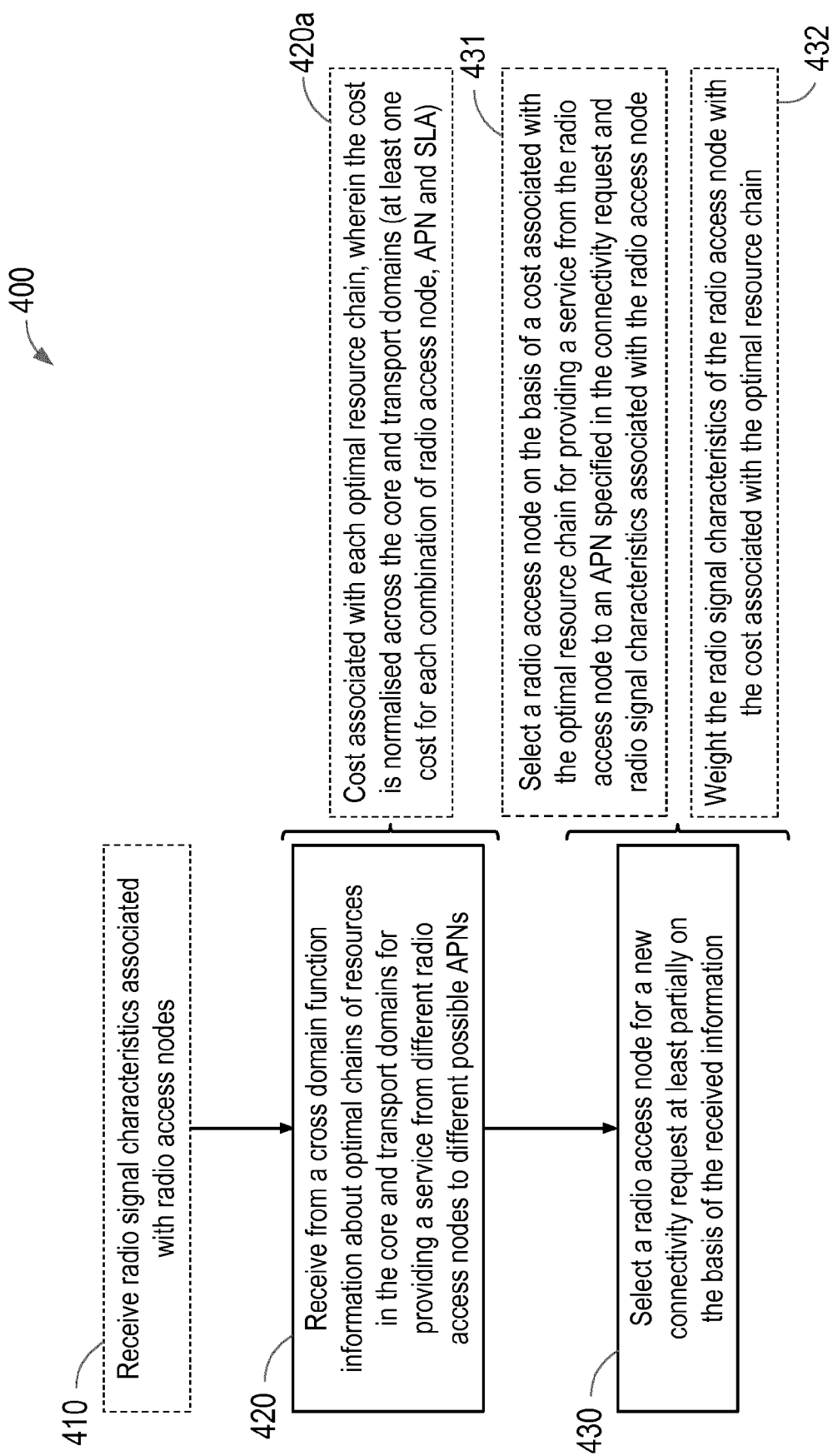
FIG. 5 is a flow chart illustrating process steps in a method for managing resource usage in a radio access domain of a communication network.

FIG. 5 illustrates process steps in a method 400 for managing resource usage in a radio access domain in a communication network. The communication network may be the same network as that discussed above with reference to FIGS. 2, 3 and 4, and may thus comprise the radio access domain, a core domain and a transport domain providing connectivity between the radio access domain and the core domain. The method 400 of FIG. 5 may for example be implemented by a Radio Access Domain Function, which function may for example be a Virtualised Network Function, and may be realised in a dedicated module or element such as a Radio Access Domain Controller. In other examples, the Radio Access Domain Function may be realised directly within basestations or in an element of the core domain, such as an MME in a 3GPP network.

Referring to FIG. 5, in a first step 410, the radio access domain control function may receive radio access signal characteristics associated with radio access nodes. This information may be received from individual UEs and may comprise information about the signal strength and/or quality of signals received by the UEs from different radio access nodes. In some examples, the radio access domain control function may also receive information about the occupation of the radio resources, for example to allow for load balancing in the radio access domain. In step 420, the radio access control function receives from a cross domain control function information about optimal chains of resources in the core and transport domains for providing a service from different radio access nodes to different possible APNs. As illustrated in step 420a, this information may comprise a cost associated with each optimal resource chain, wherein the cost is normalised across the core and transport domains. The normalised cost may be the normalised cost calculated by the cross domain control function in accordance with the steps of the method 100 of FIG. 2. Each optimal resource chain may be identified by the combination of radio access node, APN and SLA, and thus the radio access domain control function may receive at least one normalised cost for each possible combination of radio access node, APN and SLA. These normalised costs may be stored such that, for example, each radio access node has a corresponding record of normalised costs for each possible pair of destination APN and SLA.

In step 430, the radio access domain control function selects a radio access node for a new connectivity request at least partially on the basis of the received information. As illustrated in step 431, this may comprise selecting a radio access node on the basis of a cost associated with the optimal resource chain for providing a service from the radio access node to an APN specified in the new connectivity request and radio signal characteristics associated with the radio access node. In some examples, as illustrated in step 432, selecting a radio access node may comprise weighting the radio signal characteristics of the radio access node with the cost associated with the optimal resource chain.

In some examples of the present disclosure, selecting a radio access node may comprise combining the cost associated with the optimal resource chain and the radio signal characteristics according to example methods disclosed in US provisional patent application U.S. 62/417,655. According to such methods, a metric for comparing different possible radio access nodes for a new connectivity request may be generated by weighting a parameter indicating the radio signal strength and/or quality of each possible radio access node with the received normalised cost associated with the optimal resource chain from that radio access node to the specified APN and in accordance with the specified SLA from the connectivity request. If load balancing is supported, the radio signal parameter may also include the impact of resource occupancy. In some examples, in which a higher radio signal parameter indicates a more desirable radio access node, the metric for comparison of radio access nodes may be generated by dividing the radio signal parameter by the normalised cost, such that for two radio access nodes having substantially similar radio signal parameters, a higher comparison metric will be generated for the radio access node having the lower normalised cost associated with its optimal resource chain to the APN specified in the connectivity request.

Aspects of the method 400 of FIG. 5 thus enable a radio access domain control function to take into account when selecting a radio access node for a connectivity request not only the situation in the radio access domain (radio signal strength quality and in some examples radio resource occupation), but also the situation in the transport and core domains, via the normalised costs for optimal resource chains in the transport and core domains received from the cross domain control function.

Together, the methods 100, 200, 300 and 400 have the effect of implementing a globalised optimisation of resources across the radio access, transport and core domains of a communication network.

Figure 6:
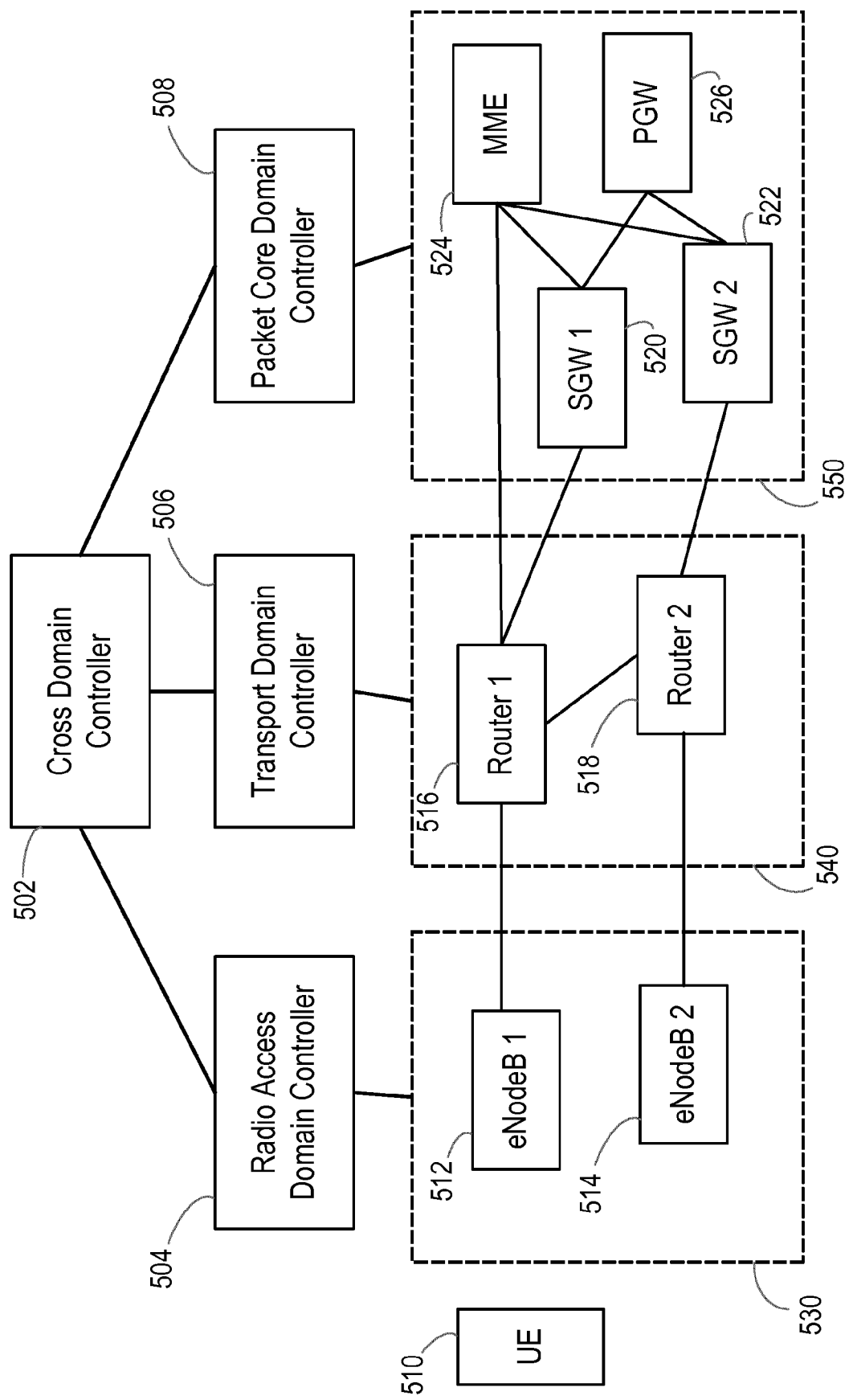
FIG. 6 illustrates an example network architecture.

FIG. 6 illustrates an example network architecture in which the methods 100, 200, 300, 400 of FIGS. 2 to 5 may be implemented. In the example architecture of FIG. 6, the cross domain control function and the individual domain control functions are realised in dedicated controllers 502, 504, 506 and 508, each domain controller being in communication with the nodes of its domain. However it will be appreciated that this arrangement is merely for the purposes of illustration, and other arrangements, in which the control functions are realised within existing network nodes, may be implemented, as discussed in further detail with reference to FIGS. 2 to 5 above.

Referring to FIG. 6, the example architecture illustrates a communication network having a radio access domain 530, a transport domain 540 and a core domain 550. The radio access domain 530 comprises eNodeBs 1 and 2, 512, 514 and is controlled by radio access domain controller 504. The transport domain 540 comprises routers 1 and 2, 516, 518 and is controlled by transport domain controller 506. The core domain comprises SGW1 520, SGW2, 522, MME 524 and PGW 526 and is controlled by packet core domain controller 508. The example architecture also comprises a cross domain controller 502 which is in communication with the individual domain controllers 504, 506 and 508.

Figure 7:
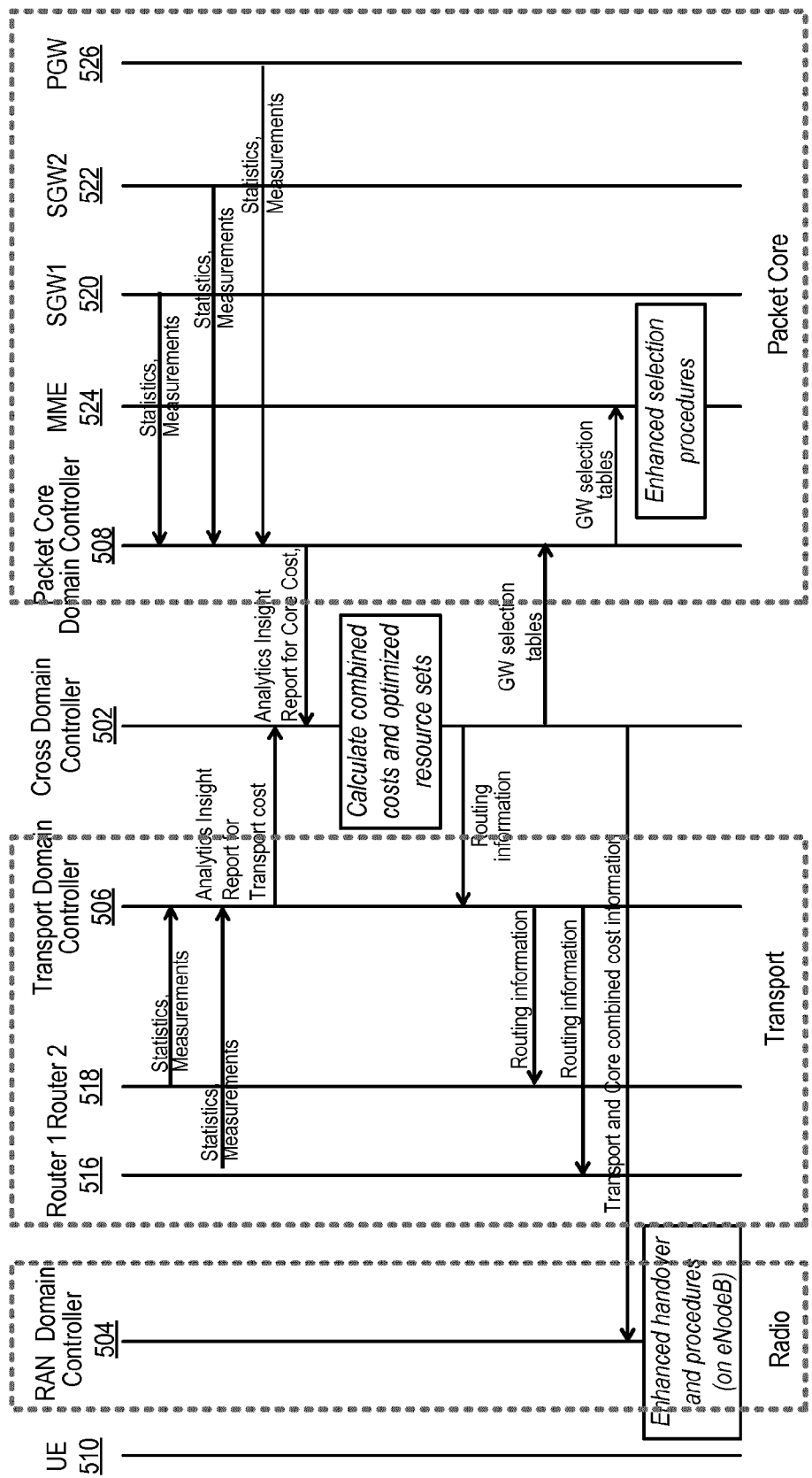
FIG. 7 illustrates message flow in the example network architecture of FIG. 6 according to examples of the methods of FIGS. 2 to 5.

FIG. 7 illustrates signalling exchange between the entities of the architecture of FIG. 6 according to examples of the methods 100, 200, 300 and 400. Considering initially the transport domain, router 1 516 and router 2 518 send to the transport domain controller 506 statistics and measurements indicating the load status of the links in the transport domain. This information is collated by the transport domain controller 506, which uses the information from the routers to prepare transport domain costs of using the various transport resources in the transport domain. These costs are sent to the cross domain controller 502. Considering now the core domain, SGW1 520, SGW2 522 and PGW 526 each send to the packet core domain controller 508 statistics and measurements indicating the load status of each of these gateway nodes. This information is collated by the packet core domain controller 508 and used by the packet core domain controller 508 to calculate core domain costs of using each of these gateway nodes. These costs are sent to the cross domain controller 502. Equipped with the transport domain costs of using transport domain resources, and the core domain costs of using core domain gateways, the cross domain controller 502 then normalises the costs to allow for comparison across domains and calculates optimal resource chains for each combination of radio access node, destination APN and SLA.

The cross domain controller 502 sends information about the calculated optimal resource chains to the three individual domain controllers. To the transport domain controller 506 the cross domain controller 502 sends routing information, identifying a tunnel path for each combination of radio access node, core gateway node and SLA. This routing information is passed by the transport domain controller 506 to routers 1 and 2, 516, 518. To the packet core domain controller 508, the cross domain controller 502 sends gateway selection tables, indicating for each combination of radio access node, destination APN and SLA, which pair of Serving and Packet Data Network gateways should be selected. This selection information is passed by the packet core domain controller 508 to the MME 524 which then implements the selection information by selecting gateways according to the tables when a new connection request is received. To the RAN domain controller 504 the cross domain controller 502 sends transport and core domain combined cost information for the optimal resource chain associated with each eNodeB in the RAN domain for each combination of destination APN and SLA. The RAN domain controller 504 combines this information with radio signal characteristic information to perform enhanced selection of eNodeBs during handover.

Figure 8:
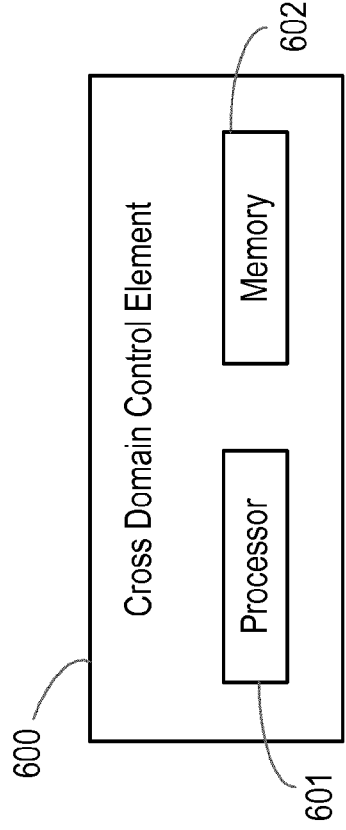
FIG. 8 is a block diagram illustrating functional units in a cross domain control element.

As discussed above, the method 100 may be performed by a cross domain control element, which be realised as a dedicated module or element such as a Cross Domain Controller or may be realised within a module or element located within any one of the network domains. Examples of such modules or elements comprise core domain elements such as gateways, a Mobility Management Entity (in a 3GPP network), or a Domain Name System, transport domain elements such as routers and radio access domain elements such as basestations (eNodeBs in 3GPP networks). FIG. 8 illustrates a first example of cross domain control element 600 which may implement the method 100 of FIG. 2, for example on receipt of suitable instructions from a computer program. Referring to FIG. 8, the cross domain control element 600 comprises a processor 601 and a memory 602. The memory 602 contains instructions executable by the processor 601 such that the cross domain control element 600 is operative to conduct some or all of the steps of the method 100.

Figure 9:
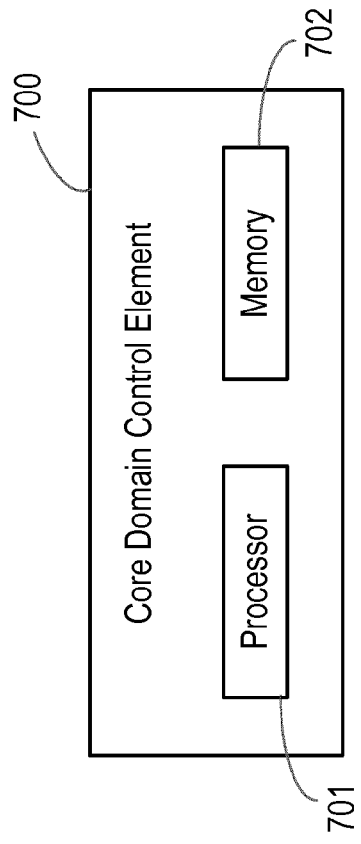
FIG. 9 is a block diagram illustrating functional units in a core domain control element.

As discussed above, the method 200 may be performed by a core domain control element which may be realised in a dedicated module or element such as a Packet Core Domain Controller, or may be realised within existing core domain elements such as gateways, a Mobility Management Entity (in a 3GPP network), or a Domain Name System. FIG. 9 illustrates a first example of core domain control element 700 which may implement the method 200 of FIG. 3, for example on receipt of suitable instructions from a computer program. Referring to FIG. 9, the core domain control element 700 comprises a processor 701 and a memory 702. The memory 702 contains instructions executable by the processor 701 such that the core domain control element 700 is operative to conduct some or all of the steps of the method 200.

Figure 10:
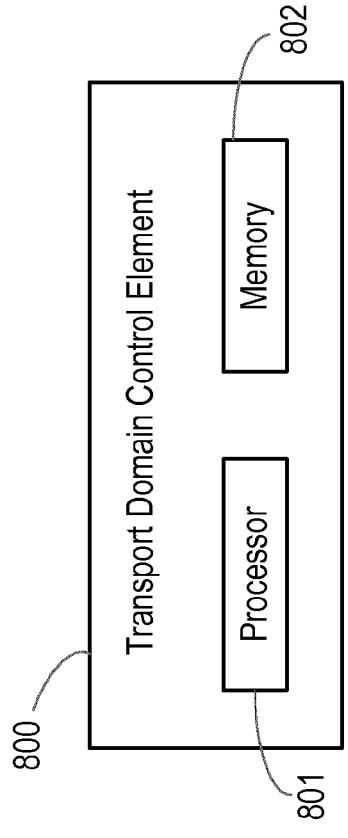
FIG. 10 is a block diagram illustrating functional units in a transport domain control element.

As discussed above, the method 300 may be performed by a transport domain control element which may be realised in a dedicated module or element such as a Transport Domain Controller, or may be realised directly within transport domain routers as part of a distributed control plane. FIG. 10 illustrates a first example of transport domain control element 800 which may implement the method 300 of FIG. 4, for example on receipt of suitable instructions from a computer program. Referring to FIG. 10, the transport domain control element 800 comprises a processor 801 and a memory 802. The memory 802 contains instructions executable by the processor 801 such that the transport domain control element 800 is operative to conduct some or all of the steps of the method 300.

Figure 11:
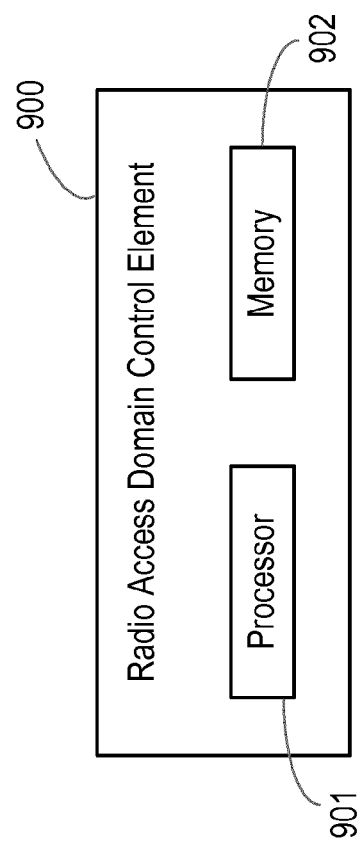
FIG. 11 is a block diagram illustrating functional units in a radio access domain control element.

As discussed above, the method 400 may be performed by a radio access domain control element which may be realised in a dedicated module or element such as a Radio Access Domain Controller or may be realised directly within basestations or in an element of the core domain, such as an MME in a 3GPP network. FIG. 11 illustrates a first example of radio access domain control element 900 which may implement the method 400 of FIG. 5, for example on receipt of suitable instructions from a computer program. Referring to FIG. 11, the radio access domain control element 900 comprises a processor 901 and a memory 902. The memory 902 contains instructions executable by the processor 901 such that the radio access domain control element 900 is operative to conduct some or all of the steps of the method 400.

Figure 12:
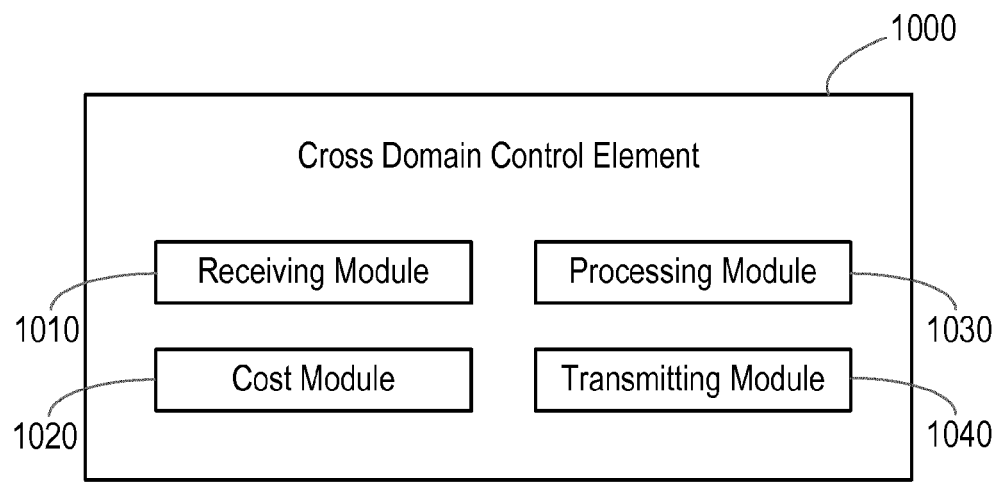
FIG. 12 is a block diagram illustrating functional units in another example of cross domain control element.

FIG. 12 illustrates another example of cross domain control element 1000 which may perform the method 100 as discussed above. The elements illustrated in FIG. 12 may be logical elements or may be dedicated physical elements and may include one or more processors. The elements may be implemented in hardware and/or software and may be integrated to any degree. Referring to FIG. 12, the cross domain control element 1000 comprises a receiving module 1010 for receiving from the core domain an indication of load status of gateway nodes in the core domain, and for receiving from the transport domain an indication of load status of transport resources in the transport domain. The cross domain control element 1000 also comprises a cost module 1020 for normalising across the core and transport domain a cost of using resources in each domain, a processing module 1030 for calculating, on the basis of the normalised costs, optimal chains of resources in the core and transport domains for providing a service from different radio access nodes to different possible APNs, and a transmitting module 1040 for sending to the core and transport domains information about the calculated optimal resource chains.

Figure 13:
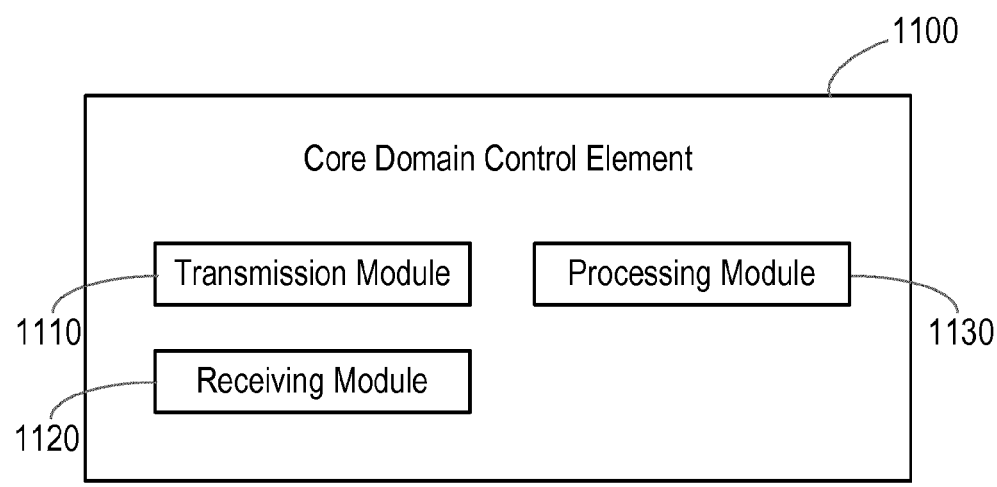
FIG. 13 is a block diagram illustrating functional units in another example of core domain control element.

FIG. 13 illustrates another example of core domain control element 1100 which may perform the method 200 as discussed above. The elements illustrated in FIG. 13 may be logical elements or may be dedicated physical elements and may include one or more processors. The elements may be implemented in hardware and/or software and may be integrated to any degree. Referring to FIG. 13, the core domain control element 1100 comprises a transmission module 1110 for sending to a cross domain function an indication of load status of gateway nodes in the core domain, and a receiving module 1120 for receiving from the cross domain function information about optimal chains of resources in the core and transport domains for providing a service from different radio access nodes to different possible APNs. The core domain control element further comprises a processing module 1130 for selecting a gateway node for a new connectivity request according to the received information about optimal resource chains.

Figure 14:
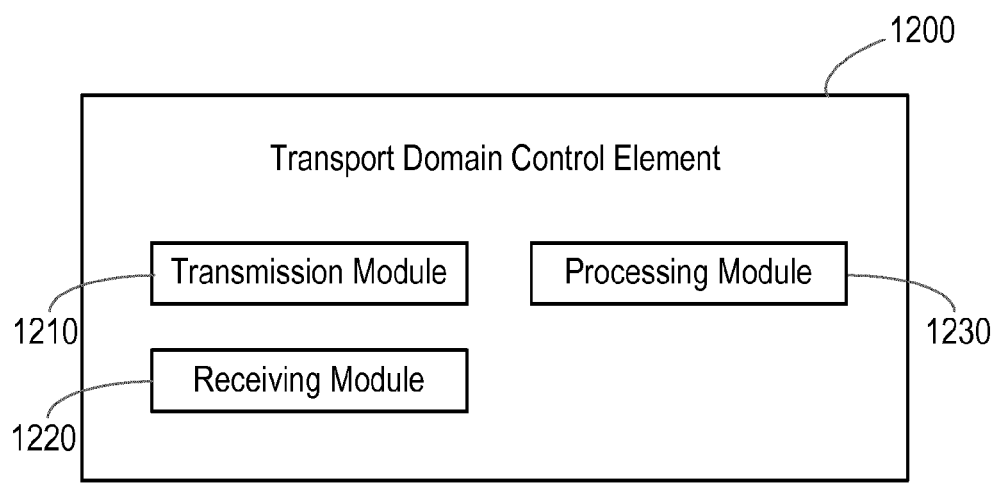
FIG. 14 is a block diagram illustrating functional units in another example of transport domain control element.

FIG. 14 illustrates another example of transport domain control element 1200 which may perform the method 300 as discussed above. The elements illustrated in FIG. 14 may be logical elements or may be dedicated physical elements and may include one or more processors. The elements may be implemented in hardware and/or software and may be integrated to any degree. Referring to FIG. 14, the transport domain control element 1200 comprises a transmission module 1210 for sending to a cross domain function an indication of load status of transport resources in the transport domain and a receiving module 1220 for receiving from the cross domain function information about optimal chains of resources in the core and transport domains for providing a service from different radio access nodes to different possible APNs. The transport domain control element further comprises a processing module 1230 for selecting transport resources for a new connectivity request according to the received information about optimal resource chains.

Figure 15:
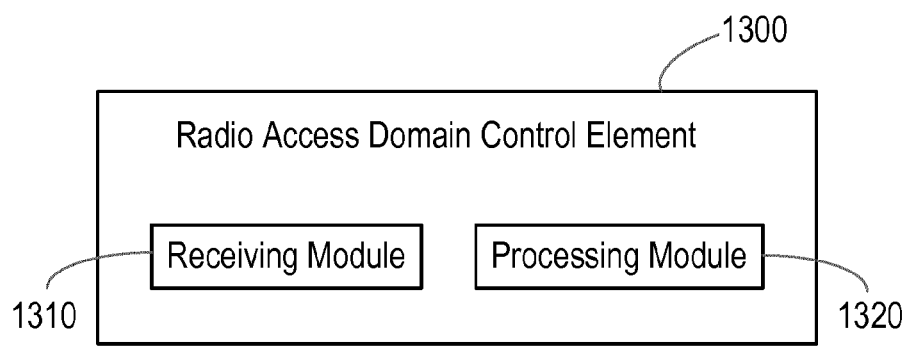
FIG. 15 is a block diagram illustrating functional units in another example of radio access domain control element.

FIG. 15 illustrates another example of radio access domain control element 1300 which may perform the method 400 as discussed above. The elements illustrated in FIG. 15 may be logical elements or may be dedicated physical elements and may include one or more processors. The elements may be implemented in hardware and/or software and may be integrated to any degree. Referring to FIG. 15, the radio access domain control element 1300 comprises a receiving module 1310 for receiving from a cross domain function information about optimal chains of resources in the core and transport domains for providing a service from different radio access nodes to different possible APNs, and a processing module 1320 for selecting a radio access node for a new connectivity request at least partially on the basis of the received information.

Using the example of a 3GPP LTE network, aspects of the present disclosure thus propose to modify radio resource management in the RAN (including for example handover procedures), SGW/PGW selection in the core and transport routing (tunnel management) by combining data from the different domains to achieve a globally optimised resource selection.

Per-network domain control functions may be introduced and, in the core and transport domains, may collect domain status information and translate this into domain specific resource cost information for sending to a newly introduced cross domain control function. The cross domain control function normalises the costs across the domains, using resource cost definitions that enable comparison of costs of different network resources across the different domains. The cross domain control function then calculates optimal resource selection across the transport and core domains. The cross domain control function sends back global optimisation information to the RAN, transport and packet core domains to allow intra domain resource selection complying with the cross domain optimisation.

The dedicated domain control functions may be placed within the network domains to have a minimal impact on the current standard architecture. The cross domain control function may be centralised and dedicated, or may be co-located with one of the domain controllers, or may be distributed in the network resources of one of the domains.

Advantages of the methods and control elements of the present disclosure include the allocation of resources according to a global vision of the network status in the three domains, allowing for the selection of a combination of resources that optimises network performance end to end. Without such global vision, some network issues may go completely ignored, resulting in poor quality of experience, and possibly failure to provide a requested service. Specific operator policies may be respected in the manner in which resource costs are calculated and normalised, such that individual network operator priorities may be respected.

The example architecture for implementing the methods discussed above is substantially compatible with current 3GPP standards, so minimising disruptions of current practices and deployed networks.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing resource usage across domains in a communication network; the communication network comprising a radio access domain, a core domain, and a transport domain providing connectivity between the radio access domain and the core domain; the method comprising:
receiving, from the core domain, an indication of load status of gateway nodes in the core domain;
receiving, from the transport domain, an indication of load status of transport resources in the transport domain;
normalizing, across the core and transport domains, a cost of using resources in each domain;
calculating, based on the normalized costs, optimal chains of resources in the core and transport domains for providing a service from different radio access nodes to different possible Access Point Names (APNs), the calculating optimal chains of resources comprising:
calculating an optimal resource chain in the core and transporting domains for each combination of radio access node, APN, and Service Level Agreement (SLA) which may apply to the service being provided;
sending, to the core and transport domains, information about the calculated optimal resource chains; and
configuring the radio access management domain to modify radio resource management in the radio access domain, the configuring comprising:
sending, to the radio access domain, the information about the calculated optimal resource chains; and
linking optimization of the radio access domain to the optimal chains of resources in the core and transport domains.

2. The method of claim 1, wherein the indication of load status of gateway nodes in the core domain comprises a core domain cost of using each gateway node in the core domain.

3. The method of claim 1, wherein the indication of load status of the transport resources in the transport domain comprises at least one of:
a transport domain cost of using individual transport resources in the transport domain; and
a transport domain cost of using at least partial paths of transport resources through the transport domain.

4. The method of claim 3, wherein each transport domain cost of using at least a partial path of transport resources through the transport domain comprises a capability of the at least partial path.

5. The method of claim 1, wherein the sending, to the core and transport domains, information about the calculated optimal resource chains comprises sending, to the core domain, an identification of gateway nodes to be used by the core domain for providing a service from different radio access nodes to different possible APNs.

6. The method of claim 5, wherein the sending, to the core and transport domains, information about the calculated optimal resource chains comprises sending, to the core domain, an identification of at least one gateway node to be used by the core domain for each combination of radio access node, APN, and Service Level Agreement (SLA) which may apply to the service being provided.

7. The method of claim 5, wherein the identification of gateway nodes comprises an identification of at least one packet gateway node and of at least one serving gateway node.

8. The method of claim 1, wherein the sending, to the core and transport domains, information about the calculated optimal resource chains comprises sending, to the transport domain, at least partial paths of transport resources through the transport domain to be used by the transport domain for providing a service from different radio access nodes to different possible gateway nodes in the core domain.

9. The method of claim 1, wherein the sending, to the core and transport domains, information about the calculated optimal resource chains comprises sending, to the transport domain, at least a partial path of transport resources through the transport domain to be used by the transport domain for each combination of radio access node, core domain gateway node, and Service Level Agreement (SLA) which may apply to the service being provided.

10. The method of claim 1, wherein the sending, to the radio access domain, information about the calculated optimal resource chains comprises sending, to the radio access domain, a normalized cost associated with each optimal resource chain.

11. The method of claim 1, wherein the calculating optimal chains of resources comprises applying a constrained shortest path algorithm to the resources across two domains to identify specific chains of resources across the two domains that can provide a service between different radio access nodes to different APNs.

12. A cross domain control element for managing resource usage across domains in a communication network, the communication network comprising a radio access domain, a core domain and a transport domain providing connectivity between the radio access domain and the core domain, the cross domain control element comprising:
processing circuitry;
memory containing instructions executable by the processing circuitry whereby the cross domain control element is configured to:
receive, from the core domain, an indication of load status of gateway nodes in the core domain;

receive, from the transport domain, an indication of load status of transport resources in the transport domain;

normalize, across the core and transport domains, a cost of using resources in each domain;

calculate, based on the normalized costs, optimal chains of resources in the core and transport domains for providing a service from different radio access nodes to different possible Access Point Names (APNs), the calculating optimal chains of resources further configured to:

calculate an optimal resource chain in the core; and transport domains for each combination of radio access node, APN, and Service Level Agreement (SLA) which may apply to the service being provided;

send, to the core and transport domains, information about the calculated optimal resource chains; and configure the radio access management domain to modify radio resource management in the radio access domain, configuring the radio access management domain comprising the cross domain control element being further configured to:

send to the radio access domain, the information about the calculated optimal resource chains; and link optimization of the radio access domain to the optimal chains of resources in the core and transport domains.

13. A method for managing resource usage in a radio access domain in a communication network, the communication network comprising the radio access domain, a core domain, and a transport domain providing connectivity between the radio access domain and the core domain, the method comprising:

receiving, from a cross domain function, information about calculated optimal chains of resources in the core and transport domains for providing a service from different radio access nodes to different possible Access Point Names (APNs);

linking optimization of the radio access domain to the calculated optimal chains of resources in the core and transport domains;

selecting a radio access node for a new connectivity request based at least partially on the received information; and receiving, from the cross domain function, information about optimal chains of resources in the core and transport domains comprises receiving, from the cross domain function, a cost associated with the calculated optimal resource chain in the core and transport domains for each combination of radio access node, APN, and Service Level Agreement (SLA) associated with the service being provided.

14. The method of claim 13 wherein selecting a radio access node for a new connectivity request based at least partially on the received information comprises selecting a radio access node based on a cost associated with the optimal resource chain for providing a service from the radio access node to an APN specified in the new connectivity request and radio signal characteristics associated with the radio access node.

15. The method of claim 14 wherein selecting a radio access node for a new connectivity request based at least partially on the received information comprises weighting the radio signal characteristics of the radio access node with the cost associated with the optimal resource chain.

16. A radio access domain control element for managing resource usage in a radio access domain of a communication network, the communication network comprising the radio access domain, a core domain, and a transport domain providing connectivity between the radio access domain and the core domain, the radio access domain control element comprising:

processing circuitry; and memory containing instructions executable by the processing circuitry whereby the radio access domain control element is configured to:

receive, from a cross domain function, information about calculated optimal chains of resources in the core and transport domains for providing a service from different radio access nodes to different possible Access Point Names (APNs);

link optimization of the radio access domain to the calculated optimal chains of resources in the core and transport domains;

select a radio access node for a new connectivity request based at least partially on the received information; and receive, from the cross domain function, information about optimal chains of resources in the core and transport domains comprises receiving, from the cross domain function, a calculated cost associated with the calculated optimal resource chain in the core and transport domains for each combination of radio access node, APN, and Service Level Agreement (SLA) associated with the service being provided.

* * * * *